US006571166B1

(12) United States Patent
Johnson et al.

(10) Patent No.: US 6,571,166 B1
(45) Date of Patent: May 27, 2003

(54) AIRPORT SURFACE OPERATION ADVISORY SYSTEM

(75) Inventors: Walter A. Johnson, Tigard, OR (US); Paul J. Keas, Lake Oswego, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/602,352

(22) Filed: Jun. 23, 2000

(51) Int. Cl.[7] .............................................. G06F 19/00

(52) U.S. Cl. ......................... 701/120; 701/13; 340/972; 340/991; 340/995

(58) Field of Search ................................ 701/3, 13, 14, 701/15, 120; 707/104.1; 340/969, 972, 973, 991, 990, 988, 995; 342/357.01

(56) References Cited

U.S. PATENT DOCUMENTS

| | | | | | |
|---|---|---|---|---|---|
| 3,940,204 | A | | 2/1976 | Withrington | 350/3.5 |
| 4,582,389 | A | | 4/1986 | Wood et al. | 350/3.69 |
| 4,669,810 | A | | 6/1987 | Wood | 350/3.7 |
| 5,714,948 | A | * | 2/1998 | Farmakis et al. | 340/961 |
| 5,745,863 | A | * | 4/1998 | Uhlenhop et al. | 701/14 |
| 6,158,866 | A | * | 12/2000 | Gulli et al. | 351/221 |
| 6,199,008 | B1 | * | 3/2001 | Aratow et al. | 701/120 |

* cited by examiner

*Primary Examiner*—Gertrude Arthur
(74) *Attorney, Agent, or Firm*—Nathan O. Jensen; Kyle Eppele

(57) ABSTRACT

A head up display system that incorporates conformal and non-conformal views and associated symbology to provide highly informative and intuitive guidance with respect to all aspects of operating an aircraft or other vehicle in a controlled geographical area, by utilizing calculated views from the pilot seat, aircraft speed, and relevant ground operation information.

20 Claims, 5 Drawing Sheets

AIRPORT SURFACE OPERATION ADVISORY SYSTEM

BACKGROUND OF THE INVENTION

This invention relates to traffic management systems, and more particularly, a surface operation advisory system for use in controlled, traffic management systems such as those at ground control operations at airports.

A variety of apparatus and methods are known and in use in the control of surface operations at airports. Typical airport operations consist of a combination of runways, taxiways, and tarmac areas that support safe and efficient airport operation. Active runway management is under separate control from taxiway and tarmac operations. At major metropolitan airports that serve dozens of daily flights a plurality of active runways and numerous taxiways may have to be traversed when maneuvering an aircraft from a parked location to its departure runway, and similarly upon landing on an active runway to an assigned parking location. During high peak traffic times inefficient ground operations can significantly affect efficient departure and arrival activity by all user aircraft. Additionally, significant safety issues are present when numerous aircraft are operating in a relatively confined area under time constraints. This situation can be even more challenging when poor visibility exists because of meteorological conditions, twilight or nighttime operations, obscuration of signage and ground paint marking, unfamiliarity by aircraft operators of the airport layout, or other relevant factors. Additionally, local markers which provide visual guidance have inherent limitations with respect to the viewing angle by a pilot, dependent upon any given aircraft size and dimension. It is also worth noting that in larger aircraft the flight crew location within the aircraft may be offset a considerable distance from the main landing gear, thereby injecting additional complexities during ground maneuvers.

Existing systems address the needs of airport ground operations through a combination of verbal communications from ground control to aircraft operators that have on-board diagrams of the airport layout. On-board diagrams may be paper products or displayed electronically, both of which require the pilot to direct his visual focus from outside the aircraft to the schematic aid inside the cockpit. Head Up Displays (HUDs) are well known in the aviation industry and are actively used during certain flight operations to convey aircraft performance and flight critical information without requiring a pilot to divert attention from outside the aircraft. A typical HUD includes a transparent display, within the pilot's typical forward view that includes a variety of symbols and numbers to assist flight operations.

There also exist precise position location systems, including satellite based location systems such as the Global Positioning System and terrestrial based systems, such as LORAN that in conjunction with widely available computer processing capability can readily provide location with respect to the earth's surface. Such systems can be enhanced with the inclusion of additional correction signals, as found in a Differential GPS system that provide increased position determination accuracy, or by the inclusion of electronic geographic databases.

Although studies have been undertaken for an improved ground operation system that would incorporate HUDs, such proposed systems lack intuitive and simplified characteristics that can provide timely and relevant information, while simultaneously allowing outside operating conditions to be seen by the pilot.

SUMMARY OF INVENTION

The present invention relates to head up display systems configured for use in ground operations. A head up display system is disclosed which comprises a signal processor, a symbol generator, and an electronic geographical database that in combination monitor location of the vehicle which includes the HUD with respect to a given reference system, such as the earth's surface and provide guidance with respect to present location with respect both to desired present location and eventual destination. The guidance information contains generated symbols that are projected upon conformal and nonconformal views on the HUD display. The HUD display may depict, at any one time, a conformal or non-conformal view or both a conformal and non-conformal view. Switching between conformal, non-conformal, or blended views of both may be manually or automatically accomplished by calculating precise location of a vehicle of known physical dimensions operating within a controlled area.

It is an object of the present invention to improve airport-operating efficiency.

It is a feature of the present invention to incorporate ground traffic clearance information to the flight crew operating an aircraft on the ground between departure or arrival runways and ultimate parking location.

It is an advantage of the present invention that aircraft utilizing such a surface operation control system minimize movement delays due to clearance confusion, blocked or obscured flight crew view of the adjacent and approaching aircraft ground track, or unfamiliarity with local conditions.

These and other objects, features, and advantages are disclosed in the specification, figures, and claims of the present invention.

DETAILED DESCRIPTION

Figure 1:
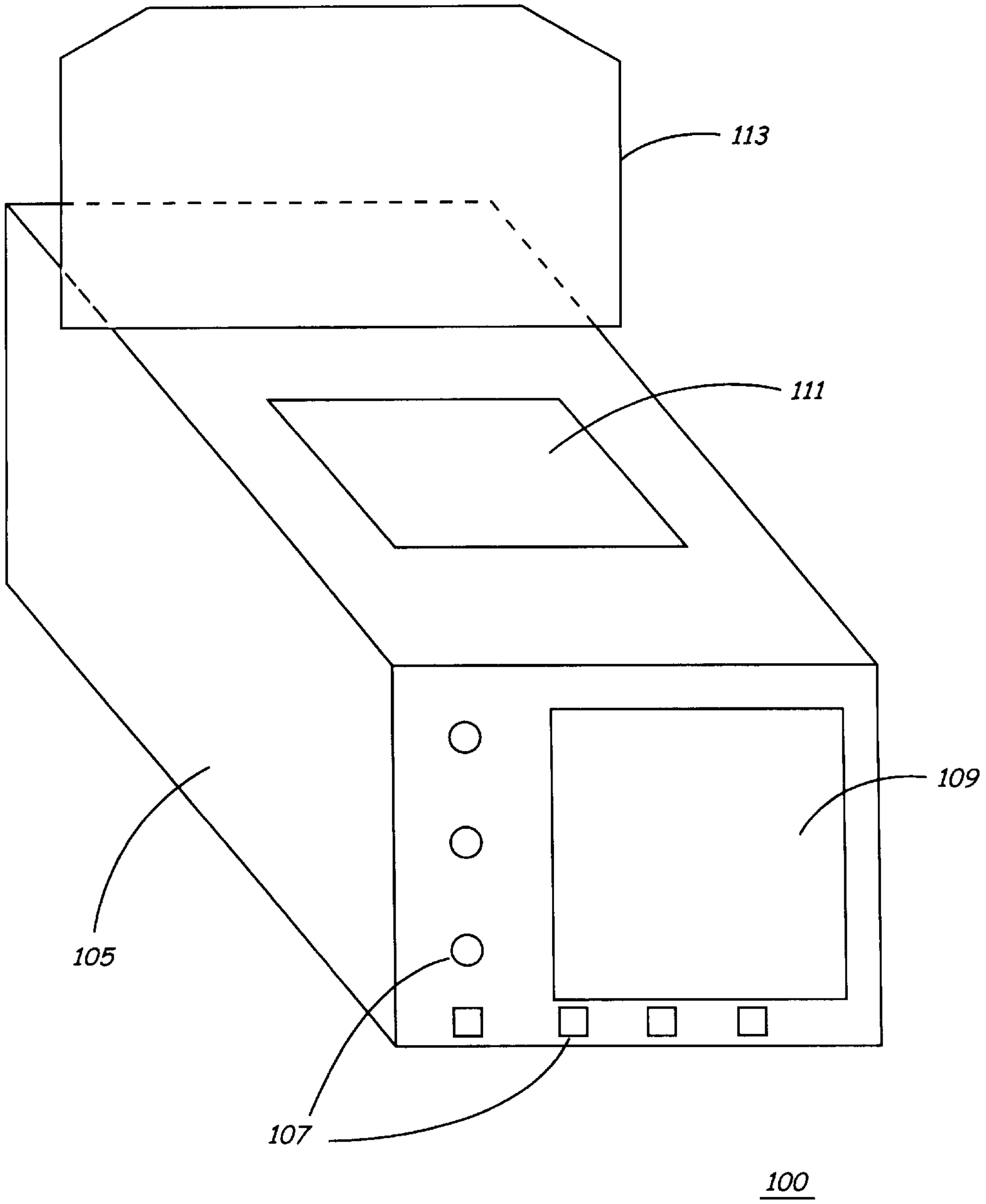
FIG. 1 is a diagrammatic view of a head up display system that incorporates the teachings of the present invention.

Referring now to the drawings wherein like numerals refer to like matter throughout, FIG. 1 shows a HUD 100 which incorporates the teachings of the present invention. HUD 100 is comprised of primary unit 105 which includes the optics and symbol generator devices, such as available from the applicant. Alternatively, a symbol generator could be separately packaged and electronically coupled to the optic unit, without compromising the advantages of the present invention. A plurality of switches or knobs, 107 allow the operator to control predetermined functionality of the HUD and may be arranged or comprise a variety of configurations. A head down display 109 is also included in the HUD 100 and allows for increased clarity and an alternate display source. An optical source display area 111 provides a variety of data and symbols that are projected on a nearly transparent glass plate panel or combiner 113, through which the pilot continues to see the outside world. The information projected on display panel 113 is focused at optical infinity, so that the pilot sees images that are superimposed on the pilot's eye view of the outside world. See, for example, U.S. Pat. No. 4,582,389 entitled "Holographic Device," U.S. Pat. No. 4,669,810 entitled "Heads Up Display System," or U.S. Pat. No. 3,940,204 entitled "Optical Display Systems Utilizing Holographic Lenses."

Although depicted as a single glass panel HUD, the advantages of the present invention are equally applicable to holographic type HUDs or helmet integrated displays (HIDs). Such technologies represent newer display concepts than traditional HUDs and are often found in certain operating environments or aircraft that require either improved see-through visibility or integrated helmet displays that track pilot eye movement.

Figure 2:
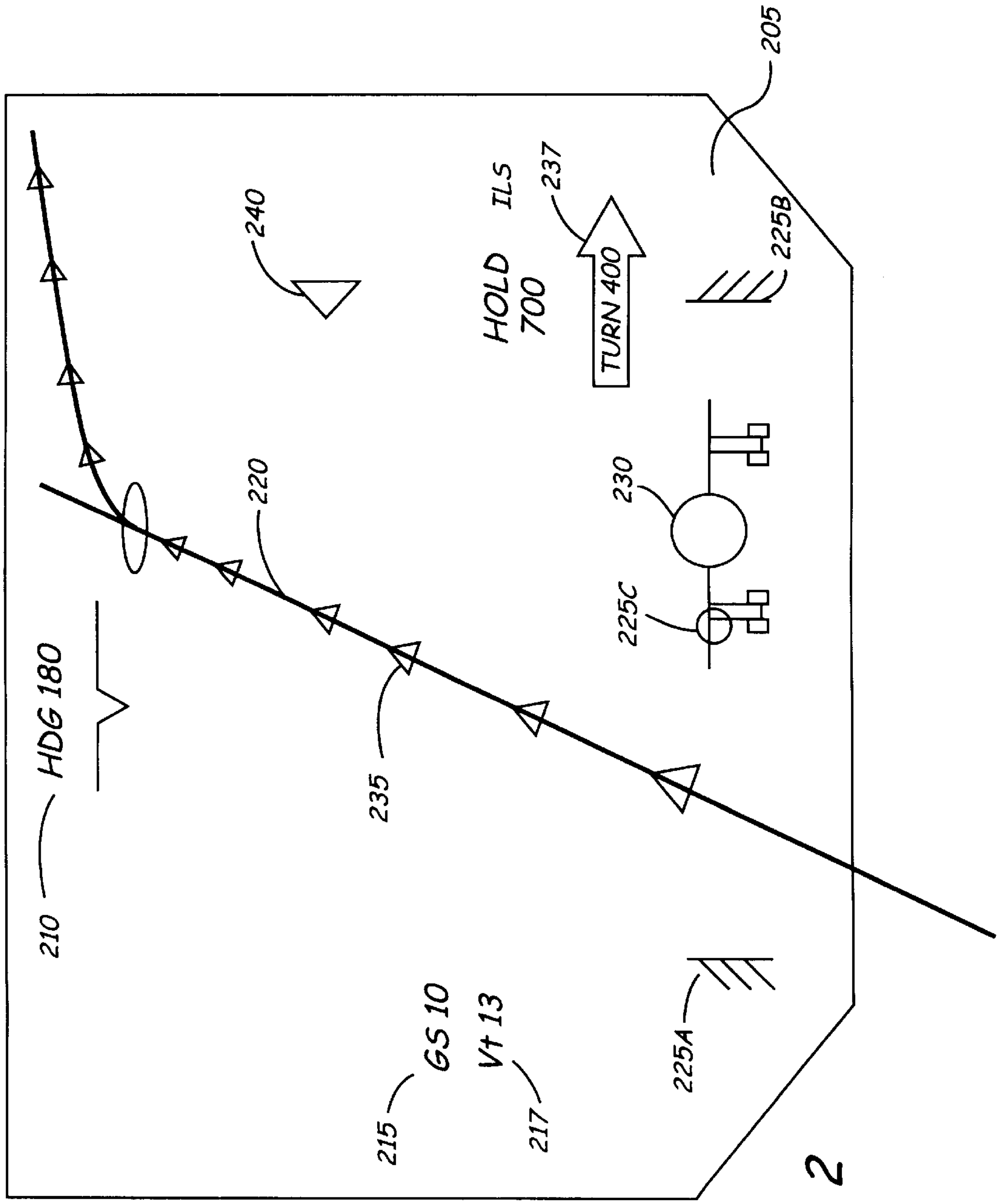
FIG. 2 is a first diagrammatic illustration of an aircraft that incorporates a head up display system of the present, having an exemplary conformal view and associated data.

FIG. 2 depicts an example of an instantaneous or "snapshot" out the window view from the cockpit of an aircraft that includes an embodiment of the present invention. The HUD includes a transparent panel 200 mounted in a manner that a pilot operating the aircraft would gaze through panel 200 when looking forward and out of the cockpit windshield. As shown FIG. 2 illustrates an aircraft taxing on taxiway 205 and provides a conformal view to the pilot. Display panel 200 includes a variety of position information of the aircraft on the runway or taxiway both with respect to current location and intended destination, as represented by symbols 210 through 240.

Symbols 210–240 will now be described in detail. Symbol 210, HDG 180, is displayed at the center top edge of panel 200 and represents the magnetic heading of the aircraft with respect to the earth's surface. Symbol 215, GS10, provides the pilot with the approximate ground speed of the aircraft in knots. Thus, symbol 215 represents an indicated present ground speed of 10 knots. Symbol 217, VT 13, contains a target speed or a not to exceed speed limit, in this case of 13 knots for the upcoming turn. The plurality of triangular symbols form a centerline 220 on the taxiway 205. Centerline 220 is not a generated symbol by the HUD but are physically located or painted on the taxiway, in a similar manner as automobile highway centerlines. The average distance between centerline triangles is fixed at a predetermined length, such as fifty feet, so as to convey additional position information to the pilot. Symbol 225A and 225B are generated by the HUD and represent the left (225A) and right (225B) taxiway 205 edges. Symbol 230 represents a vertical cross section of the airplane taken through the wings and main landing gear. Symbol 225C represents the centerline of the taxiway, as contrasted to taxiway edges 225A and 225B—as shown providing guidance indicating required steering input by the pilot to steer toward the aircraft to the left. Symbol 237, a block arrow, is generated by the HUD and indicates to the pilot to turn right after traveling an additional 400 feet. Symbol 240, a left pointing solid arrow, is generated by the avionics and displayed upon panel 210. Symbol 240 is a warning to the pilot that the present aircraft location with respect to the taxiway edge exceeds normal, safe conditions, a correction to the left would alleviate the anomaly. In operation symbol 240 could also rapidly blink, at a frequency similar to an automobile turn signal.

Figure 3:
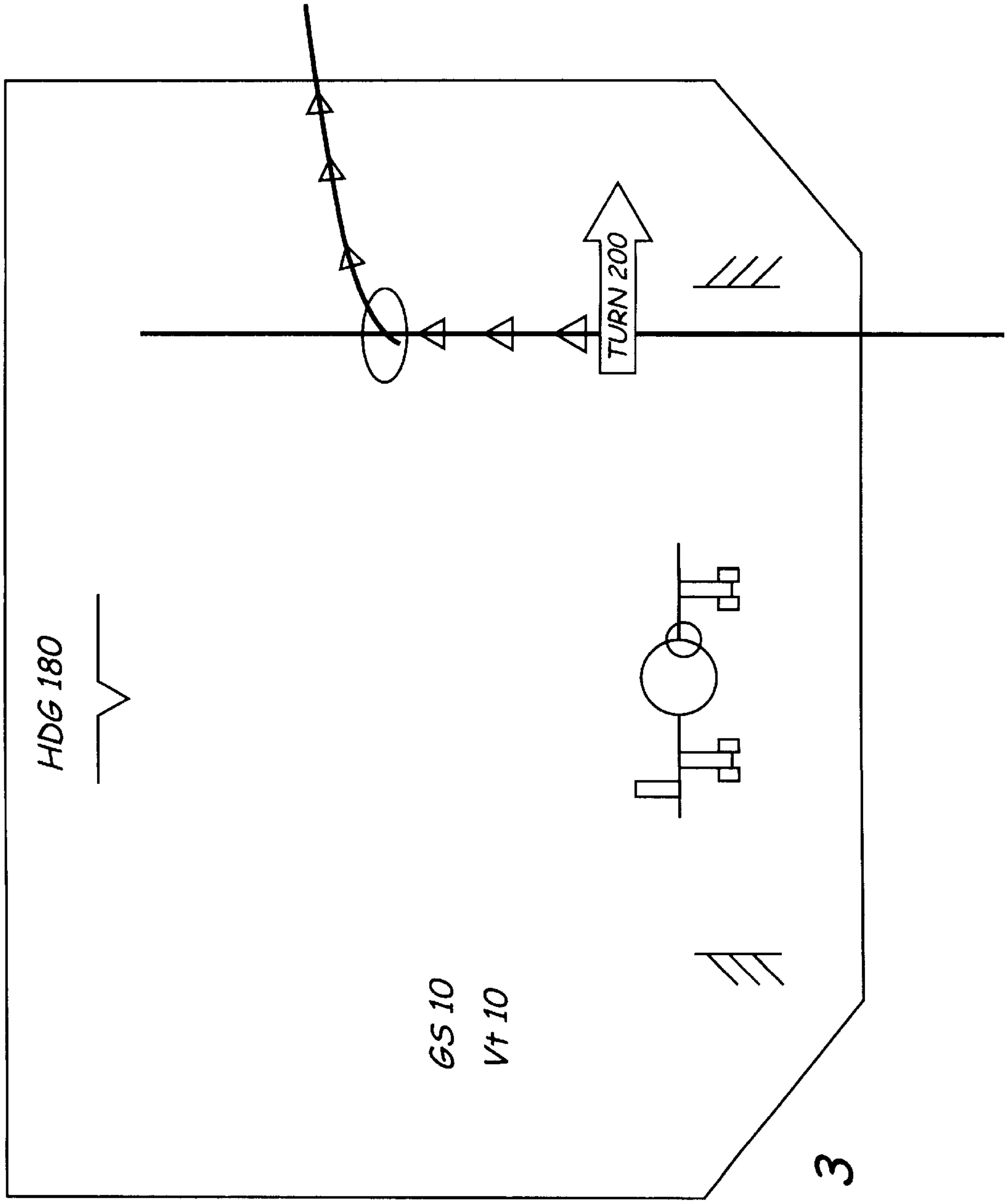
FIG. 3 is a second diagrammatic illustration of an aircraft that incorporates a head up display system of the present, having an second exemplary conformal view and associated data.

FIG. 3 depicts an alternate instantaneous position information and movement guidance illustration for an aircraft using a HUD that incorporates the advantages of the present invention. A variety of information that portrays the new position and relative situation are displayed on panel 205. The aircraft has moved closer to its instructed right turn, as indicated in block arrow 237. Arrow 237 now displays the numeral 200, to indicate an approximate distance in feet prior to beginning the turn. The taxiway edges 225A and 225B are again shown in the lower portion of the panel 113 (See FIG. 1), along with fuselage center guidance cue symbol 225C. In this instance the aircraft symbol 230 is displayed left of the guidance cue symbol 225C, indicating that the pilot should correct slightly back to the right in order to place the center of the fuselage directly over the guidance cue and corresponding desired location, such as the taxiway centerline.

The vertical bar 310 that extends upward from the left edge of the aircraft symbol wing represents the current ground speed is in excess of preferred operating conditions. The overspeed situation is also displayed and quantified by the ground speed indicator symbol and associated value GS 20, which represents a current ground speed of 20 knots. The preferred turn speed limit is 10 knots as provided by the displayed turn speed symbol VT and the associated value of 10 knots. Thus, the pilot should slow the aircraft to a ground speed of 10 knots from its current speed of 20 knots prior to entering the right turn in approximately 200 feet. As in FIG. 2, a plurality of symbols 235, in this case triangular shaped, are superimposed on the taxiway centerline providing both distance and directional information. The elliptical shape symbol 315 indicates the approximate location that the cockpit portion of the airplane fuselage will be when the aircraft speed reaches the target speed, 217.

Figure 4:
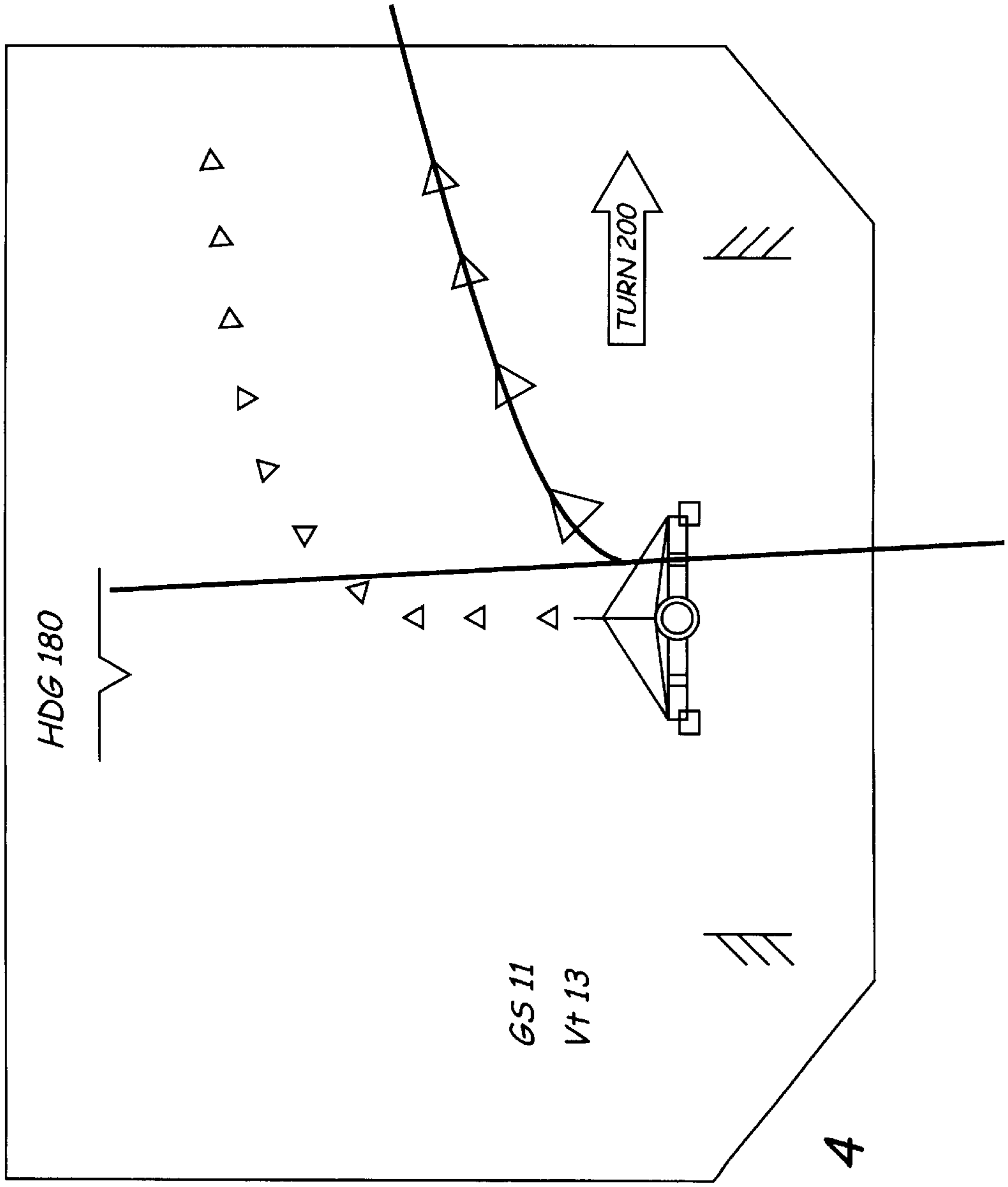
FIG. 4 is a third diagrammatic illustration of an aircraft that incorporates a head up display system of the present, having an exemplary blended conformal view imposed over a non-conformal view and associated data.

FIG. 4 depicts an example of a non-conformal view in combination with a conformal view on the HUD system providing ground movement information to the pilot of the aircraft that includes the HUD. As in FIGS. 2 and 3, various information is provided in symbol format such as ground speed, relative taxiway edge location, and taxiway centerline information along with distance marker information. To alert the pilot that a non-conformal view is displayed, the aircraft icon, 405 differs from the previous icon utilized in FIGS. 2 and 3. More specifically, aircraft symbol 405 depicts a view from above, with a depiction of the nose gear and two main gear at the corners of a triangle. In addition to the conformal view of outside the cockpit, the flight deck crew is provided a non-conformal perspective view of the taxiway centerline, 410. The non-conformal view is referenced to the aircraft main landing gear and provides situational awareness and perception of the curved taxiway that is the intended and cleared route of travel, but which may be obscured or not visible due to the displacement between the cockpit and main landing gear. Other symbols on FIG. 4 are consistent with previous descriptions provided in FIGS. 1–3.

Figure 5:
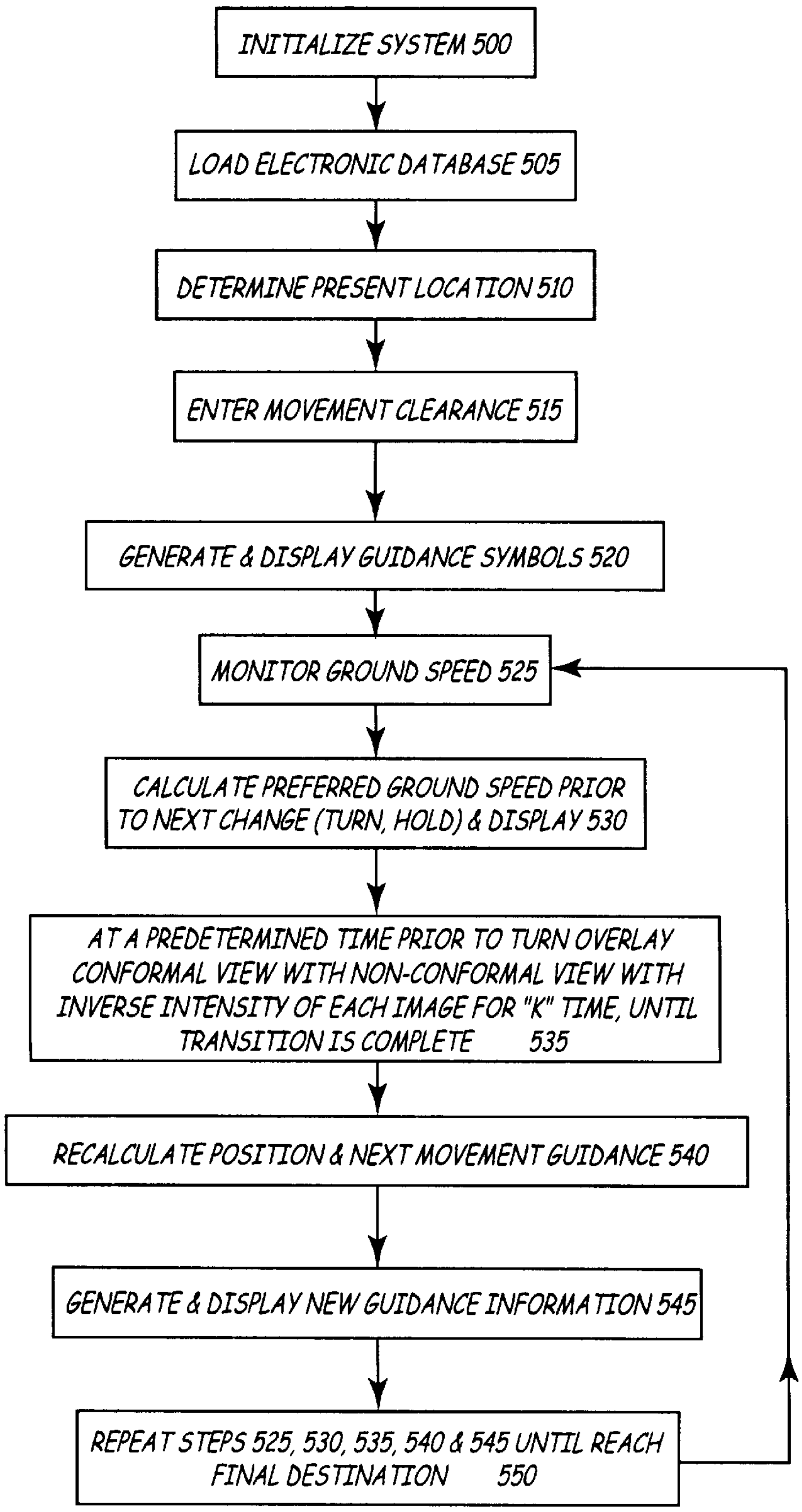
FIG. 5 is a flow diagram of one implementation of the method of displaying relevant airport surface operation information described in the present invention.

FIG. 5 represents a flow diagram of the steps completed by the present invention in normal operation. As a first step 500, the on-board computer system which incorporates a combination of hardware and software which implements the steps of FIG. 5, initializes its relevant operating system. The next step 505 of the disclosed method would be the loading of pertinent application software and electronic data. Pertinent electronic geographical information can be obtained from vendors such as Jeppesen Sanderson, Inc.

Once the system is operating and has accessed the relevant geographical database, the present aircraft location must be determined, step 510. This step can be accomplished manually, or automatically, via a satellite-based system, such a GPS or a terrestrial based geo-positioning system.

Step 515 requires the entering of the taxing or movement clearance either via datalink or by a member of the aircraft flight crew into the system. This step is accomplished utilizing either an alphanumeric keypad, voice, touch screen, datalink or other well-known computer data input device. The next step 520 requires the generation and display of guidance symbols to be displayed on the HUD system.

In order to provide relevant information concerning the preferred ground speed, contrasted to the actual ground speed, an input signal that provides current aircraft ground speed must be provided to the HUD system and monitored, step 525. In addition to actual ground speed, the present invention computes and displays a target speed, such as a desired turn speed to assist the pilot in maintaining a predetermined maximum lateral acceleration for passenger comfort consideration or other speed limit constraints (such as for an upcoming taxi hold), step 530. This predetermined value of maximum lateral acceleration when the aircraft is in a turn is typically in the range of 0.1 g. A speed error tape (310 of FIG. 3) is displayed prior to and during each turn. Speed error is defined as the excess between the current speed and the target speed. The speed error tape appears when a given threshold value is exceeded, in the current instance a deceleration in excess of 0.1 g's prior to reaching a desired future position, such as the start of a turn. Once displayed the speed error tape continuously indicates an excess speed condition until the aircraft future position is reached or the speed is appropriately reduced. In addition and alternatively to continuous display of the speed error tape, the speed error tape may be emphasized by flashing, bold face, or colors should the excess speed condition be grossly excessive. An example of a gross excessive speed would be the requirement of a 0.2 g deceleration prior to the turn point, when contrasted to current speed and a predetermined distance X from commencing said turn. The emphasis on the speed tape error is terminated upon the detection that the remaining deceleration is within acceptable predetermined norms, such as 0.1 g in magnitude. It should also be noted that the speed error tape is only visible when the current speed is an excess of a predetermined maximum speed. The value "X" is pre-computed for each turn and would necessarily be aircraft specific, taking into account aircraft weight and the viewing angle from the pilot's head to the taxiway. It should be noted that step 525 and 530 could readily be swapped in order without significantly altering the advantages of the present invention.

At a predetermined time interval prior to reaching a position, the HUD system includes both a conformal view and non-conformal view on the combiner with inverse illumination intensity, step 535. The change from a conformal to a non-conformal view is automatically accomplished when the system determines that pilot's view of the taxiway will be obstructed or obscured. The fade-in and fade-out occurs over a predetermined time period, arbitrarily assigned by the system designer. In the instant case a two-second overlap of the conformal and non-conformal views are established consistent with a determination of the anticipated disappearance of the taxiway centerline no longer in the HUD display field of view.

Upon completion of a turn or other ground maneuver, the system recalculates the next movement guidance, step 540 and generates appropriate symbols that are in turn projected upon the HUD display panel (113 of FIG. 1), step 545. Steps 540 and 545 are repeated, step 550, until the aircraft arrives at its ultimate ground destination.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

We claim:

1. A system for providing airport surface operation information to an aircraft pilot in conformal, non-conformal or combined conformal and non-conformal views, comprising:

a display including a symbol generator mounted in the aircraft;

a computer coupled to the display;

a position determination device mounted in the aircraft and coupled to the computer that provides information of the aircraft position with respect to the surface of the earth;

an electronic database that includes detailed airport information that can be accessed by the computer; and an aircraft ground speed sensor for providing an input signal to the computer for determining aircraft ground speed when the aircraft is operating on the surface of the earth;

wherein the display provides a variety of aircraft location and authorized non-runway ground movement guidance information to the aircraft pilot, while the aircraft is located on the surface of the earth, in either a conformed view, a non-conformed view, or both conformed and non-conformed dependent upon a calculated pilot view from the aircraft windshield, as determined by aircraft location, aircraft heading, traffic route information with respect to aircraft location, aircraft, on the ground, operating speed and current non-runway ground movement clearances.

2. The system of claim 1 wherein the display is a single panel head-up display.

3. The system of claim 1 wherein the display is a multi-panel head-up display.

4. The system of claim 1 wherein the display is a helmet integrated display.

5. The system of claim 1 wherein the position determination device is a satellite positioning receiver system.

6. The system of claim 5 wherein the satellite positioning receiver system comprises a differential GPS receiver.

7. The system of claim 1 where the position determination device is a terrestrial based positioning system.

8. The system of claim 1 wherein the simultaneous display of a conformed view and a non-conformed view, is accomplished with inverse light intensity of each view, as the display transitions over a predetermined time from a conformed view to a non-conformed view or from a non-conformed view to a conformed view.

9. The system of claim 8 wherein the predetermined time period is approximately two seconds.

10. An enhanced method of airport surface movement operation including an on-board aircraft situational awareness system that provides movement clearance information and precise aircraft ground location in a blended conformal and non-conformal manner, comprising the steps of:

Initializing the situational awareness system;

loading electronic airport ground navigational database;

determining present aircraft location;

entering aircraft movement clearance, when received from the airport surface operations controller;

generating and displaying aircraft movement guidance symbols; monitoring aircraft location and speed;

calculating preferred ground speed for given aircraft prior to a required turn in the direction of aircraft travel;

displaying preferred ground speed of aircraft;

overlaying a conformal view of the instantaneous view out the aircraft windshield with a non-conformal view, at a predetermined time prior to entering a required turn;

updating displayed information to reflect next movement guidance clearance;

generating and displaying new guidance information; and repeating the step of updating displayed information, until aircraft transitions to flight or parked.

11. The method of claim 10 further including displaying current aircraft location with respect to current location references.

12. The method of claim 11 wherein the displaying current aircraft location with respect to current location references, depicts reference to the taxiway centerline.

13. The method of claim 11 wherein the step of displaying aircraft movement clearance symbols, further includes a symbolic representation of the anticipated aircraft ground location for reaching preferred aircraft ground speed.

14. The method of claim 10 wherein the step of displaying aircraft movement clearance symbols includes display of a measured ground speed.

15. The method of claim 10 wherein entering aircraft movement clearance is accomplished via a datalink between the aircraft and a ground controller.

16. The method of claim 10, further comprising maintaining the overlayed conformal and non-conformal view is maintained for a predetermined time of less than five seconds.

17. A system for providing airport surface operation information to an aircraft pilot in conformal, non-conformal or combined conformal and non-conformal views, comprising:

a display including a symbol generator mounted in the aircraft;

a computer coupled to the head-up display;

a position determination device mounted in the aircraft and coupled to the computer that provides information of the aircraft position with respect to the surface of the earth;

an electronic database that includes detailed airport information that can be accessed by the computer;

a wireless datalink operable between the aircraft and an authority for issuing aircraft movement clearance on the airport surface; and an aircraft speed sensor for providing an input signal to the computer for determining aircraft speed;

wherein the head-up display provides a variety of aircraft location and authorized movement guidance information to the aircraft pilot in either a conformed view, a non-conformed view, or both conformed and non-conformed dependent upon a calculated pilot view from the aircraft windshield, as determined by aircraft location, aircraft heading, traffic route information with respect to aircraft location, aircraft operating speed and current non-runway ground movement clearances.

18. The system of claim 17 wherein the display is a multi-panel head-up display.

19. The system of claim 17 wherein the position determination device is a satellite positioning receiver system.

20. The system of claim 17 where the position determination device is a terrestrial based positioning system.

* * * * *